United States Patent
Klemm et al.

(10) Patent No.: US 11,761,805 B2
(45) Date of Patent: Sep. 19, 2023

(54) FLOWMETER

(71) Applicant: SICK Engineering GmbH, Ottendorf-Okrilla (DE)

(72) Inventors: Markus Klemm, Ottendorf-Okrilla (DE); Eric Starke, Ottendorf-Okrilla (DE); Christian Schulz, Ottendorf-Okrilla (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 55 days.

(21) Appl. No.: 17/221,508

(22) Filed: Apr. 2, 2021

(65) Prior Publication Data

US 2021/0310839 A1    Oct. 7, 2021

(30) Foreign Application Priority Data

Apr. 3, 2020 (EP) ..................... 20168003

(51) Int. Cl.
G01F 1/667 (2022.01)
G01F 1/66 (2022.01)

(52) U.S. Cl.
CPC .............. G01F 1/667 (2013.01); G01F 1/662 (2013.01)

(58) Field of Classification Search
CPC ............. G01F 1/667; G01F 1/662; G01F 1/66
See application file for complete search history.

(56) References Cited

U.S. PATENT DOCUMENTS 5,228,347 A * 7/1993 Lowell .................. G01F 1/662
73/861.27
2006/0117867 A1   6/2006 Froelich et al.
(Continued)

FOREIGN PATENT DOCUMENTS

CN   102135441 A    7/2011
DE   29719730 U1   12/1998
(Continued)

OTHER PUBLICATIONS

Machine translation of EP2278280A1 (Year: 2011).*
(Continued)

*Primary Examiner* — Alesa Allgood
*Assistant Examiner* — Sangkyung Lee
(74) *Attorney, Agent, or Firm* — Nath, Goldberg & Meyer; Jerald L. Meyer

(57) ABSTRACT

The invention relates to a flow measuring device comprising a meter body having a conduit for the fluid, two phased-array ultrasonic transducer units spaced apart in the longitudinal direction of the conduit, which can emit and receive ultrasonic signals at different angles, a control and evaluation unit for driving the ultrasonic transducer units and evaluating the received ultrasonic signals and determining the flow using the transit time of the ultrasonic signals on the measuring paths. In order to provide an improved flowmeter with which a high measurement accuracy with good signal quality can be achieved using secant paths, it is proposed that the ultrasonic transducer units define at least two measurement paths between them, depending on the angle of the emitted ultrasonic signals, along which paths the ultrasonic signals pass from one to the other ultrasonic transducer unit, and that at least one of the measurement paths has at least one reflection on a conduit wall of the conduit and path sections are defined by the reflection or reflections.

4 Claims, 4 Drawing Sheets

(56) References Cited

U.S. PATENT DOCUMENTS

Figure 1:
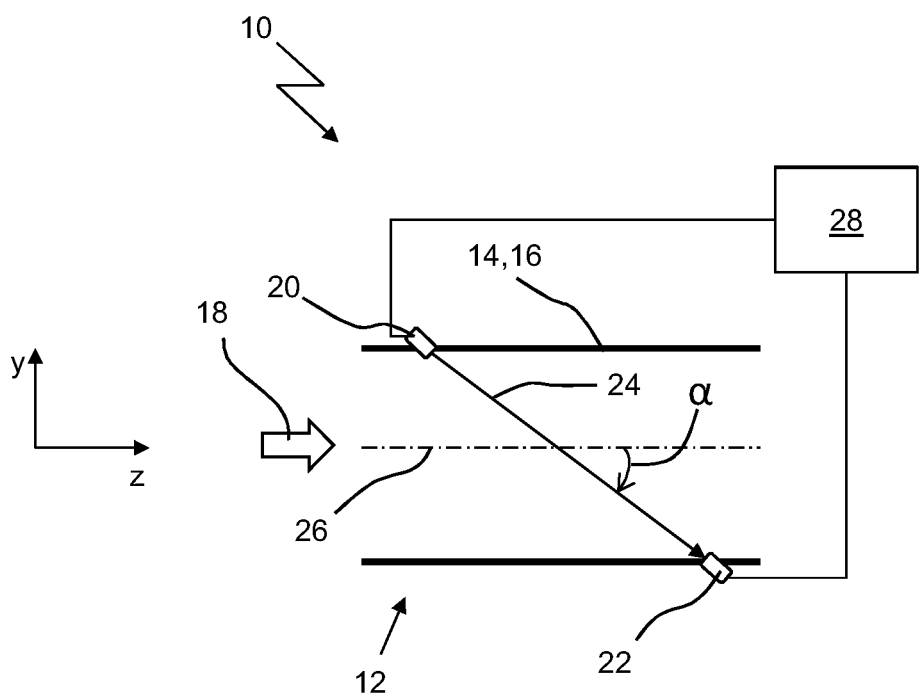

| | | |
|---|---|---|
| 2014/0366642 A1 | 12/2014 | Tanaka et al. |
| 2020/0072649 A1 | 3/2020 | Papathanasiou et al. |
| 2020/0132527 A1* | 4/2020 | Kippersund .............. G01F 1/66 |

FOREIGN PATENT DOCUMENTS

| | | | |
|---|---|---|---|
| DE | 10235033 A1 | 2/2004 | |
| DE | 102017110308 A1 | 11/2018 | |
| EP | 0917645 A1 | 5/1999 | |
| EP | 2278280 A1 * | 1/2011 | ............. G01F 1/662 |
| EP | 2278280 A1 | 1/2011 | |
| EP | 3521773 A1 | 8/2019 | |

OTHER PUBLICATIONS

Eriksson T.J.R. "Development of Piezoelectric and Electrodynamic Flexural Transducers for Air-Coupled Ultrasonics" PHD thesis, University of Warwick, UK, Sep. 2016.

Kang, L., et al. "Two-Dimensional Flexural Ultrasonic Phased Array for Flow Measurement" 2017 IEEE International Ultrasonics Symposium, Washington, DC, USA Sep. 6-9, 2017.

* cited by examiner

FLOWMETER

The invention relates to an ultrasonic-based flowmeter.

Different measuring principles are known for determining the flow velocity or the flow rate on the basis of ultrasound. In a Doppler method, the frequency shift of an ultrasonic signal reflected within the flowing fluid, which varies depending on the flow velocity, is evaluated. In a differential time-of-flight method, a pair of ultrasonic transducers is mounted on the circumference of the conduitline with a mutual offset in the longitudinal direction, which alternately emit and register ultrasonic signals transverse to the flow along the measurement path spanned between the ultrasonic transducers. The ultrasonic signals transported through the fluid are accelerated or decelerated by the flow, depending on the direction of travel. The resulting transit time difference is calculated with geometric variables to give an average flow velocity of the fluid. Together with the cross-sectional area, this yields the volumetric flow or flow rate. For more precise measurements, several measurement paths can also be provided, each with a pair of ultrasonic transducers, in order to measure a flow cross-section at more than one point. For high measurement accuracy in the case of asymmetrical velocity distributions over the flow cross-section, several measurement paths are required that do not run through the conduit axis, so-called non-diametric measurement paths or secant paths.

The ultrasonic transducers used to generate the ultrasound must couple the ultrasound into the fluid. A common solution is to have the ultrasonic transducers protrude into the conduit with direct contact to the fluid. The disadvantages are a disturbance of the flow and thus inaccurate measurement results, a direct contact with the fluid and its pressure and temperature, and possible deposits of impurities from the fluid.

In principle, techniques are also known in which the inner wall remains completely closed by attaching ultrasonic transducers to the conduit from the outside by means of the so-called clamp-on mounting. Then, the ultrasound has to penetrate through the conduit wall into the medium which is detrimental.

From the PhD thesis "Development of piezoelectric and electrodynamic flexural transducers for air-coupled ultrasonics" by Tobias Eriksson, Univ. of Warwick, September 2016, downloadable at https://pugwash.lib.warwick.ac.uk/record=b3084015~S15, the use of so-called "phased-array" ultrasonic transducer units is known. A "phased-array" unit consists of individual ultrasonic transducers arranged in an array, which together in superposition emit an ultrasonic signal whose radiation direction can be changed by changing the individual phases of the individual ultrasonic transducers. These "phased-array" ultrasonic transducer units are inserted into openings in a flow channel and are then as flush as possible with the conduit wall and can emit ultrasonic signals at different angles depending on the actuation. As stated in the thesis, this allows a single pair of phased-array ultrasonic transducer units to replace multiple pairs of traditional ultrasonic transducers, as shown in FIG. 1.1 of the thesis.

An application of such phased-array ultrasonic transducer units is also disclosed, for example, in Kang, Lei, Feeney, Andrew, Su, Riliang, Lines, David, Jager, Axel, Wang, Han, Arnaudov, Yavor Emilov, Ramadas, Sivaram Nishal, Kupnik, Mario and Dixon, Steve M. (2017) Two-dimensional flexural ultrasonic phased-array for flow measurement. In: 2017 IEEE International Ultrasonics Symposium (IUS), Washington, D.C., USA, 6-9 Sep. 2017. Published in: 2017 IEEE International: Ultrasonics Symposium (IUS) ISSN 1948-5727. Here, the phased-array ultrasonic transducer units are used to compensate for the blowing effect at high flow velocities. However, in connection with phased-array ultrasonic transducer units, only diametrical measurement paths running through the conduit axis are disclosed. In the case of non-axially symmetrical flow profiles, diametrical measurement paths result in inaccurate measurement values, since the flow profile is only inadequately recorded across the cross-section.

Based on this prior art, it is the object of the invention to provide an improved device for measuring the flow of a fluid, with which in particular the aforementioned disadvantages can be avoided, i.e. to provide a high measurement accuracy with good signal quality using secant paths.

This task is solved by a flowmeter for measuring the flow of a fluid through a conduit comprising:

- a meter body that has a conduit for the fluid,
- two phased-array ultrasonic transducer units spaced apart along the length of the conduit and the units can radiate and receive ultrasonic signals at different angles,
- a control and evaluation unit for controlling the ultrasonic transducer units and evaluating the received ultrasonic signals and determining the flow rate using the transit time of the ultrasonic signals on the measuring paths,
- wherein the ultrasonic transducer units define between them, depending on the angle of the emitted ultrasonic signals, at least two measurement paths along which the ultrasonic signals pass from one to the other ultrasonic transducer unit,
- wherein at least one of the measuring paths has at least one reflection at a conduit wall of the conduit and path sections are defined by the reflection or reflections. A path section is therefore always the part of a measurement path on which the ultrasound can propagate unhindered in a straight line. According to the invention, the ultrasonic transducer units are located at an installation angle of between 20° and 140°.

The installation angle is the angle between the two ultrasonic transducer units that results when looking in the longitudinal direction of the conduit and looking at the relative position of the ultrasonic transducer units on the conduit circumference to each other. An installation angle of 180° would correspond to a diametrical installation. An installation angle of 0° corresponds to the arrangement as shown in FIG. 1.1 of the doctoral thesis mentioned at the beginning.

With the arrangement according to the inventive subject matter, different measurement paths are possible with only two ultrasonic transducer units, whereby these measurement paths, or the path sections of these measurement paths, are located in sensible and different areas of the cross-section, so that the flow across the cross-section of the conduitline is better detected.

The inventors have found that it is particularly advantageous if the installation angle is between 30° and 50° in particular.

It is particularly advantageous if r/R is between 0.3 and 0.65 for the path sections, where R is the conduit diameter and r is the shortest distance of a path section to the center. Then the measuring paths with their path sections are located particularly favorably for sensibly scanning the flow. They lie off-center but also not too close to the edge. The paths then also lie approximately on Gaussian nodes. This is advantageous because in Gaussian nodes the flow profile does not change with the velocity of the fluid. Overall, this results in higher measurement accuracy.

In a further advantageous embodiment of the inventive subject matter, there are no more than five reflections per measurement path. Measurement paths with more than five reflections do not provide any added value, because many of the possible measurement paths with more than five reflections cannot be used sensibly, since their path sections are located along the edge of the conduit, for example, or are too much in the middle and therefore almost diametrically opposed.

Figure 4:
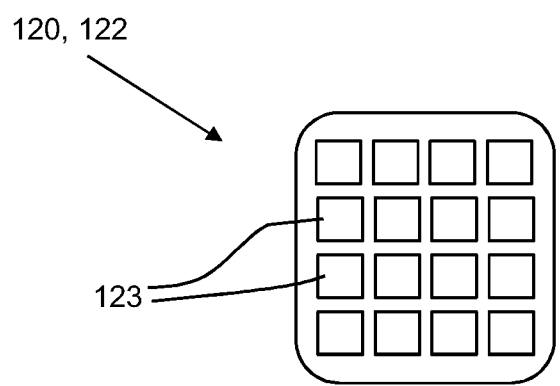
Figure 2:
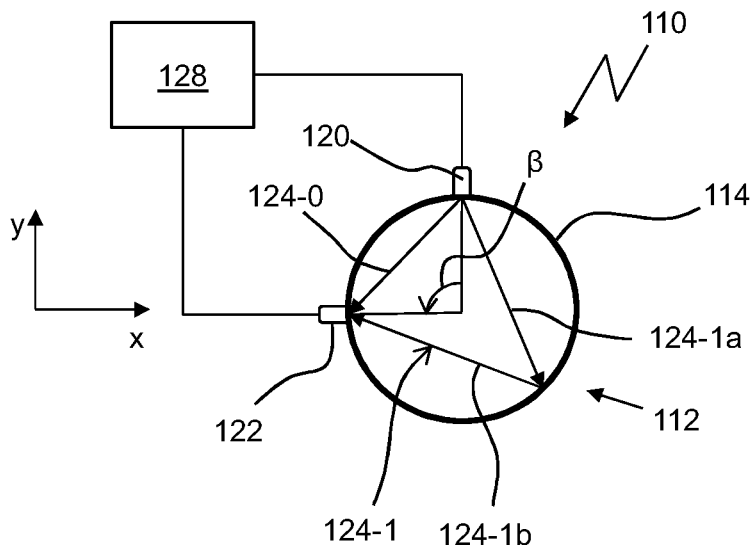
Figure 3:
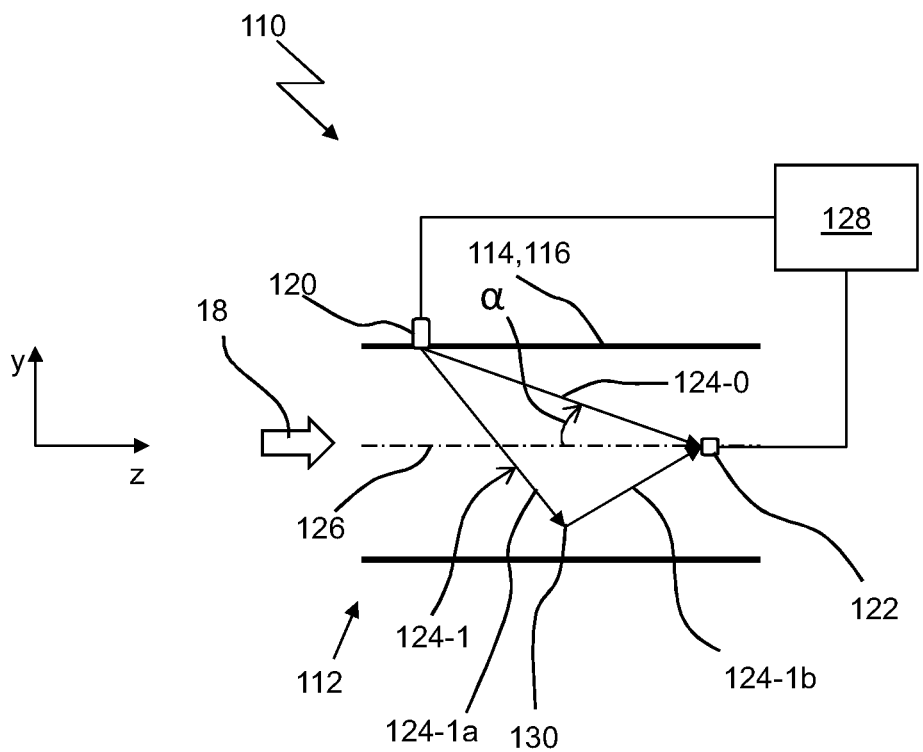
Figure 5:
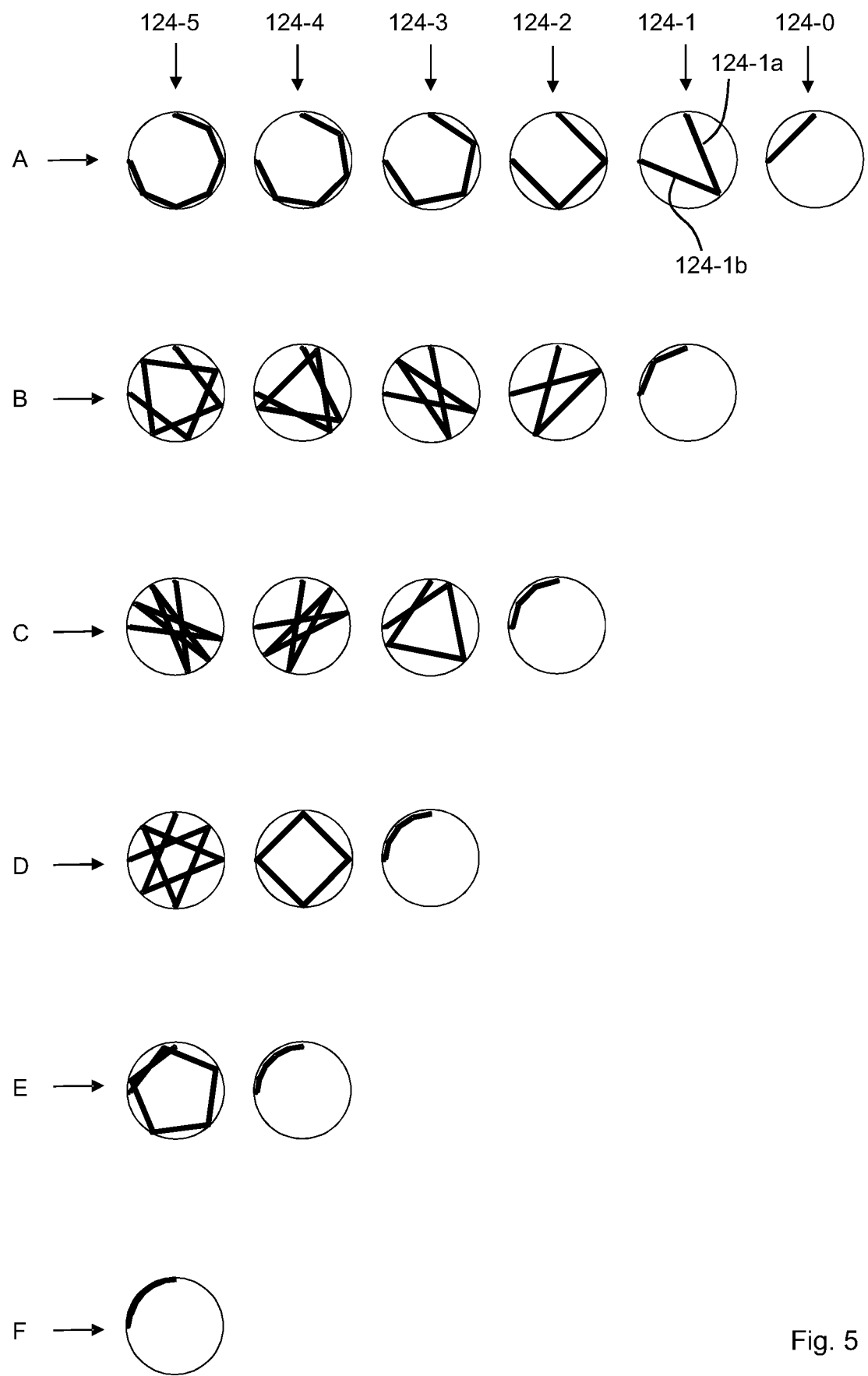
Figure 6:
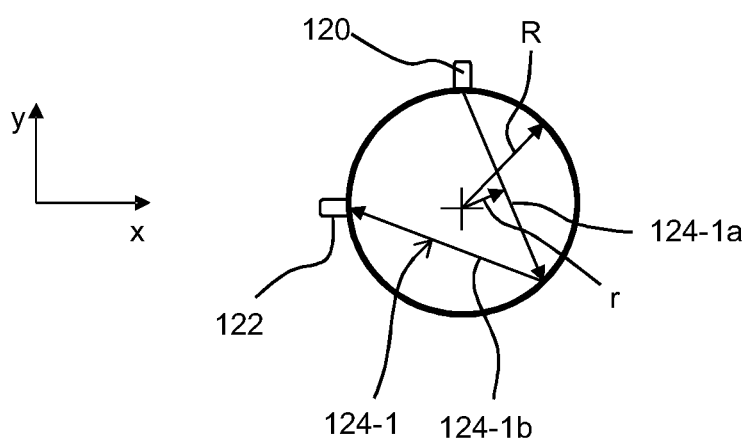

In the following, the invention is explained in detail by means of embodiments with reference to the drawing. Shown in the drawing:

FIG. 1 a schematic representation of a prior art flowmeter;

FIG. 2 a schematic representation of a flowmeter according to the inventive subject matter, viewed in the longitudinal direction of the conduit;

FIG. 3 a schematic representation of the flowmeter of FIG. 2 according to the inventive subject matter viewed transversely to the longitudinal direction of the conduit;

FIG. 4 a schematic view of a phased-array ultrasonic transducer;

FIG. 5 representations of measuring paths viewed in the longitudinal direction of the conduit;

FIG. 6 a view like FIG. 2.

FIG. 1 illustrates a prior art flowmeter 10 for general explanation of the function of a generic flowmeter. The flowmeter 10 includes a meter body 12 having a conduit 14 for the fluid with a conduit wall 16. The fluid, a gas or liquid, flowing through the conduit 14 is shown in FIG. 1 with a broad arrow 18 and flows in a z-direction along a longitudinal direction 26 of the conduit 14.

Further, the flowmeter 10 has two ultrasonic transducers 20 and 22 defining a measurement path 24 between them in the conduit 14. The ultrasonic transducers 20 and 22 are offset in the flow direction z, that is, they are spaced apart in the longitudinal direction 26 of the conduit 14. As a result, the measurement path 24 is not orthogonal to the flow direction z, but is at an angle $\alpha$. Each of the ultrasonic transducer units 20 and 22 can operate as a transmitter or receiver and is controlled by a control and evaluation unit 28.

The length L of the measurement path 24 in the fluid medium results from the angle $\alpha$ and the conduit diameter D. Ultrasonic signals that are emitted and received as ultrasonic wave packets on the measurement path 24 in opposite directions thus have a component in the direction of the flow direction z in one case and against the flow direction z in the other case. Thus, the ultrasonic wave packets are accelerated with the flow 18 in the first case and decelerated against the flow 18 in the other case. The flow velocity v of the fluid 18 is calculated in this time-of-flight procedure according to $$v = \frac{t_2 - t_1}{2 * t_2 * t_1} * \frac{L}{\cos(\alpha)} \quad (1)$$

where t2 and t1 denote the ultrasound travel times required by the radiated ultrasound wave packets to travel upstream and downstream of the measurement path 24, respectively, and are recorded in the control and evaluation unit 28. The conduit cross-section and the flow velocity v of the fluid 18 can then be used to calculate the flow rate.

The flowmeter 110 according to the inventive subject matter, which is shown very schematically in FIGS. 2 and 3, also operates according to this principle. It also has a meter body 112 with a conduit 114 and two ultrasonic transducer units 120 and 122 in a conduit wall 116 and a control and evaluation unit 128.

However, the ultrasonic transducer units 120 or 122 are not "simple" ultrasonic transducers, but are designed as phased-array ultrasonic transducer units. As shown schematically in the schematic top view of FIG. 4 onto a sound-emitting side of the ultrasonic transducer unit 120 or 122, they each have a two-dimensional array of individually controllable ultrasonic transducers 123. For emitting an ultrasonic packet, the individual ultrasonic transducers 123 are controlled by the control and evaluation unit 128 in such a way that they each have a phase offset with respect to one another, the phase offset being selected in such a way that the superposition of the resulting ultrasonic waves results in an ultrasonic wave packet which moves along a specific measurement path 124. The direction of the measurement path 124 is thus determined by the phase offset and should be aligned so that the ultrasonic wave packet reaches the other ultrasonic transducer unit.

The invention consists essentially in the positioning of the two ultrasonic transducer units 120 and 122 and the choice of possible measurement paths 124.

FIGS. 2 and 3 show an exemplary arrangement of ultrasonic transducer units 120 and 122. In order to describe the relative arrangement of the ultrasonic transducers 120 and 122, an installation angle $\beta$ is defined for the purposes of this description. The angle of installation $\beta$ is understood to be the angle between the two ultrasonic transducer units 120 and 122 that is obtained by looking longitudinally along the central axis 126 of the conduit 114 and looking at the relative position of the ultrasonic transducer units 120 and 122 on the circumference of the conduit (FIG. 2). Or, in other words, this is the angle $\beta$ that the two linkings between ultrasonic transducer 120 or 122 and central axis 126 enclose when looked along the longitudinal direction. A mounting angle of 180° would correspond to a diametrical mounting. In FIG. 2, an installation angle $\beta$ of 90° is shown.

In accordance with the invention, the ultrasonic transducer units 120 and 122 are at an installation angle that is between 20° and 140°, and more particularly between 30° and 50°.

For the embodiments in this description (FIGS. 2, 3 and 5), an installation angle $\beta$ of 90° was selected, since such an angle is most suitable for drawing and for the descriptive explanation.

In FIGS. 2 and 3, two measuring paths 124-0 and 124-1 are drawn as examples in this ultrasonic arrangement. On the first measurement path 124-0, the ultrasonic signals travel directly from one ultrasonic transducer unit 120 or 122 to the other ultrasonic transducer unit 122 or 120. This direct measurement path 124-0 therefore does not include any reflection on the conduit wall 116. This is also expressed by the addition "-0" to the reference sign. On the other measurement path 124-1, the ultrasonic signals experience one single reflection at a point 130 on the conduit wall 116 (also expressed by the addition "-1"). Due to the reflection, the measurement path 124-1 is divided into two path sections 124-1a and 124-1b. The two path sections 124-1a and 124-1b are of equal length, even if this looks different in the drawing plane of the actually three-dimensional arrangement of FIG. 3. A path section, here 124-1a or 124-1b, is therefore always the part of a measurement path, here 124, on which the ultrasound can propagate unhindered and therefore in a straight line.

With the arrangement according to the invention, consisting of the two ultrasonic-transducer units 120 and 124 at an installation angle β, measurement paths 124-0 and 124-1 other than those shown in FIGS. 2 and 3 are of course also possible.

Possible measurement paths 124 are shown in simplified form in FIG. 5. These are measurement paths with 0 to 5 reflections. Measurement paths 124-0 with no reflection and 124-1 with one reflection and path sections 124-1*a* and 124-1*b* were explained above with reference to FIGS. 2 and 3. As can be readily seen, with N reflections, there are always N+1 possible alternatives for the measurement path. These path alternatives are marked with capital letters A to F. For example, for measurement path 124-1 with only one reflection, there is still an alternative B where the path sections are relatively close to the wall.

The inventors have found that in an advantageous embodiment of the invention, there should be no more than five reflections per measurement path, i.e., the design of the measurement paths 124 should be limited to those shown in FIG. 5. Measurement paths with more than five reflections do not provide any added value, because many of the possible measurement paths with more than five reflections cannot be used in a meaningful way, since their path sections are, for example, located along the edge of the conduit (as can already be seen in FIG. 5 for measurement path 124-5 in alternative F) or are located too much in the middle and are therefore almost diametrically opposed (as measurement path 124-5 in alternative C tends to show). If the measurement paths remain within the limits shown, the path sections of these measurement paths 124 are located in sensible and different areas of the cross-section, so that the flow over the cross-section of the conduitline 114 is better detected.

Further, the inventors have found that it is particularly advantageous if it applies to the path sections that r/R is between 0.3 and 0.65, where R is the conduit diameter and r is the shortest distance of a path section to the center point (shown in FIG. 6 using path section 124-1*a*). Then, the measuring paths 124 with their path sections are located particularly favorably for sensibly scanning the flow 18. They lie off-center but also not too close to the edge. The paths then also lie approximately on the Gaussian node. This is advantageous because in the Gaussian node the flow profile does not change with the velocity of the fluid. Overall, this results in higher measurement accuracy. Measurement paths for which this applies particularly well would be, for example, the following measurement paths:

124-1 Alternative A
124-2 Alternatives A and B
124-3 Alternatives B and C
124-4 Alternatives B and C
124-5 Alternatives B and D.

The invention claimed is:

1. A flowmeter for measuring the flow rate of a fluid (18), comprising:
   a meter body (112) having a conduit (114) for the fluid (18);
   two phased-array ultrasonic transducer units (120, 122) spaced apart in the longitudinal direction (126) of the conduit (114) and capable of radiating and receiving ultrasonic signals at different angles; and
   a control and evaluation unit (128) for controlling the phased-array ultrasonic transducer units (120, 122) and evaluating the received ultrasonic signals and determining the flow rate using time-of-flight of the ultrasonic signals on measurement paths (124),
   wherein the measurement paths (124) defined by the phased-array ultrasonic transducer units (120, 122) comprise at least two measurement paths (124-0, 124-1, 124-2, 124-3, 124-4, 124-5) between the two phased-array ultrasonic transducer units (120, 122), depending on the angle of the emitted ultrasonic signals, along which paths the ultrasonic signals pass from one of the phased-array ultrasonic transducer units to the other of the ultrasonic transducer units,
   wherein at least one of the measurement paths (124-1, 124-2, 124-3, 124-4, 124-5) has at least one reflection (130) on a conduit wall (116) of the conduit (114) and path sections (124-1*a*, 124-1*b*) are defined by the at least one reflection, and
   wherein the phased-array ultrasonic transducer units (120, 122) are at an installation angle (β) that is between 20° and 140°, wherein the installation angle (β) is an angular span between the two phased-array ultrasonic transducer units (120, 122) with respect to a circumference of the conduit (114).

2. The flowmeter according to claim 1, wherein the installation angle is between 30° and 50°.

3. The flowmeter according to claim 1, wherein for the path sections, r/R is between 0.3 and 0.65, where R is a conduit diameter and r is a shortest distance of a path section to a center.

4. The flowmeter according to claim 1, wherein there are no more than five reflections per measurement path.

\* \* \* \* \*